July 23, 1968
B. SILVER
3,393,924
TOWING UNIT FOR VEHICLES
Filed July 8, 1966
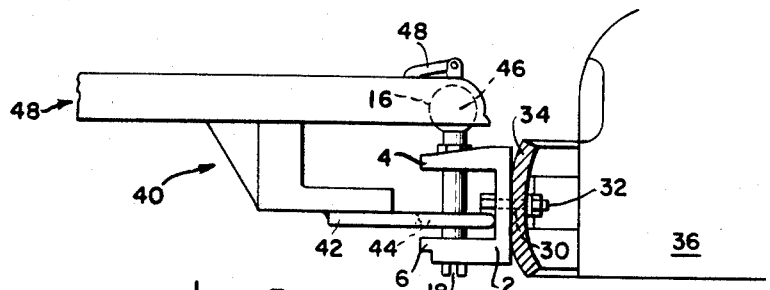
FIG.I.
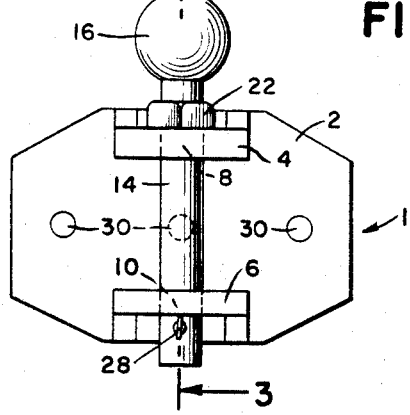
FIG.2.
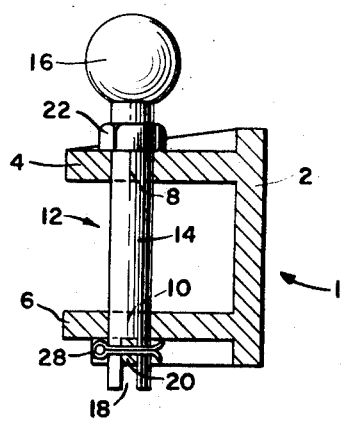
FIG.3.
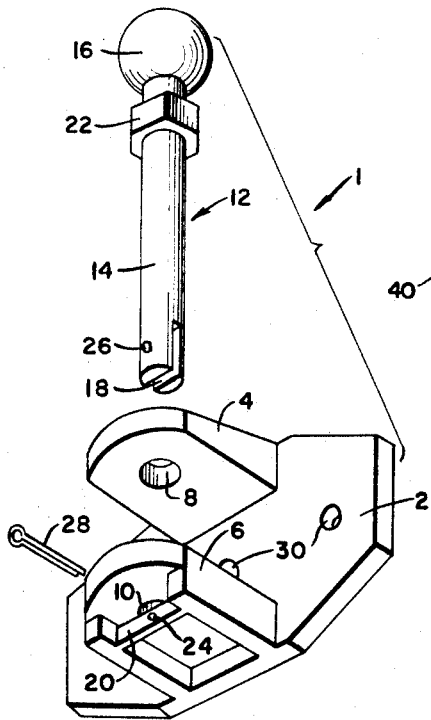
FIG.4.
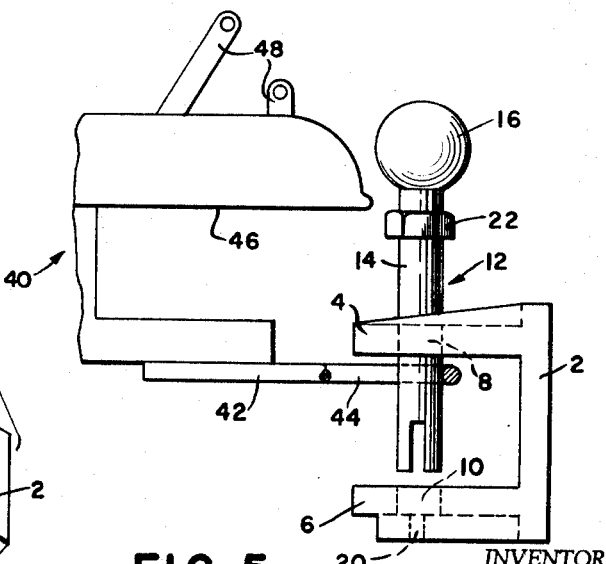
FIG.5.
INVENTOR
Boris Silver
BY Clive H. Bramson
ATTORNEY

United States Patent Office 3,393,924
Patented July 23, 1968

3,393,924
TOWING UNIT FOR VEHICLES
Boris Silver, 2340 New York Ave.,
Huntington Station, N.Y. 11743
Filed July 8, 1966, Ser. No. 563,796
4 Claims. (Cl. 280—461)

ABSTRACT OF THE DISCLOSURE

A coupling unit for vehicles having a base part vertically attached to the rear of the towing vehicle and a combination post-hitch and ball-hitch member which is vertically secured to said base part. A coupler which is attached to the front end of the draft vehicle includes a ring passage and a ball socket. Said post-hitch and ball-hitch members are connectible to said ring passage and ball socket respectively whereby a dual type of coupling arrangement is simultaneously effectuated.

---

This invention relates to coupler or hitch devices for connecting trailer or draft vehicles to motor vehicles such as automobiles, trucks and the like.

The present invention is more particularly related to a coupling unit for vehicles which comprises a unique combination of a conventional ball-type hitch and a post-type hitch whereby both of the latter can be simultaneously utilized to the end of providing a double-hitch-coupling arrangement between the towing and draft vehicles.

Whereas simplicity and safety encompass the foremost desiderata of structures employed for coupling and hitching purposes, the new and useful coupling unit according to the instant invention, provides a device of such nature which may readily be connected to the towing vehicle without requiring the application of additional bulwark or bracing members to said vehicle in preparation for the attachment of the coupling unit thereto, and whereby the concurrent use of the ball-and post-hitches affords a measure of safety not heretofore achievable.

Accordingly, and in consonance with the foregoing, the instant invention has for an object the provision of a towing unit for vehicles which may be attached directly to the bumper or body of the towing vehicle.

Another object of the present invention is to provide a device of the foregoing character which will afford a dual type of coupling arrangement although only a single coupling unit is utilized.

A further object of this invention resides in the provision of a device wherein the ball-hitch member also provides gripping means for rapidly manipulating the post-hitch means into and from the support therefor.

Another object of the present invention is to provide a device in accordance with the foregoing wherein the ball- and post-hitch members are integrally and coaxially related.

Still another object of the invention resides in the provision of a towing unit including means for retaining the post- and ball-hitch members against rotation and withdrawal from the supporting structure.

Another general object of the present invention is to provide a device of the described character which will be simple in structure, economical of manufacture, easily and quickly installed and highly effective in use.

Other objects and advantages of the instant towing unit will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

FIGURE 1 is a side elevational view of the towing unit shown attached to the bumper of a towing vehicle and coupled with the corresponding coupler of a draft vehicle;

FIGURE 2 is a plan elevational view of the towing unit;

FIGURE 3 is a side elevational partial cross-sectional view of the towing unit taken along line 3—3 of FIGURE 2;

FIGURE 4 is a perspective view of the towing unit, the several parts thereof being separately shown; and FIGURE 5 is a side elevational view of the towing unit shown in the process of being connected to the draft vehicle coupler.

Referring now to the present preferred embodiment of the invention illustrated in the accompanying drawings, FIGURES 1–5 show the towing unit designated generally by numeral 1 in the various positions as heretofore described.

Essentially, the towing unit or coupling unit, as it is also referred to herein, will be seen to be comprised of base part 2 and a pair of spaced projection members 4 and 6 extending normally and upwardly from said base part, the latter and said projection members being preferably integral and of cast or forged steel construction. The thus mentioned parts, it will be appreciated, may be united through welding or by suitable fastening means. It will be further seen that said projection members are each provided with passages 8 and 10, respectively, extending therethrough, said passages being in axial alignment as shown.

Post-hitch means generally designated by numeral 12, is comprised of a cylindrical shaft 14 having a ball-hitch member 16 at one end and split or bifurcation 18 at the other end, said post-hitch means being receivable through said passages 8 and 10 as particularly illustrated in FIGURES 2 and 3.

Plate member 20, otherwise referred to herein as post-hitch securement means, is connected integrally to projection member 6 and is arranged to partially obstruct said passage 10.

With reference now to FIGURE 3, it will be seen that when said post-hitch means 12 is disposed through said passages 8 and 10, the bifurcated end 18 which functions as means to prevent rotation of said post-hitch means when the latter is received within said passages, straddles said plate member 20 to thus preclude such rotation.

Stop means 22 is provided annularly of said post-hitch means and coupled with the effect of said bifurcated end straddling said plate member, substantially reduces longitudinal play of said post-hitch means with respect to said passages.

To the end of precluding withdrawal of shaft 14 from said passages, an aperture 24 provided through said plate member 20, is adapted to align with aperture 26 provided through said shaft 14 when said shaft is fully received within projection members 4 and 6 as illustrated in FIGURES 2 and 3 of the drawings. When so received, a cotter pin 28 positioned through said aligned apertures precludes withdrawal of said shaft from passages 8 and 10 and therefore, from said projection members.

Base part 2, as shown, includes a plurality of bolt-holes 30, wherethrough bolts 32 are receivable for securing the coupling unit 1 to the bumper 34 or other suitable portion of a tow vehicle 36.

Coupler 40 which comprises a horizontally disposed bar 42 having a ring passage 44 therein, and a conventional ball socket 46 located vertically above said ring passage, is connected at 48 to a draft vehicle. In operation, the coupling unit 1 is preferably connected to the bumper of the towing vehicle in the aforedescribed manner whereby the passages 8 and 10 are disposed in vertical alignment. Ring passage 44 of coupler 40 is next positioned between projection members 4 and 6 whereby shaft 14 of said post-hitch means 12 can concurrently extend through said passages 8 and 10 and said ring passage 44. Bar 42 is then moved toward base part 2 whereby said ball socket 46 will be moved into vertical alignment with respect to said ball-hitch 16 and said socket and ball-hitch are secured by locking means 48 as shown in FIGURE 1 of the drawings. It will be seen that placement of said post-hitch and ball-hitch is facilitated by the presence of the ball-hitch, the latter being easily gripped by the user.

The foregoing coupling embodiment, it will be appreciated, depends on the enlarged nature of ring passage 44 with respect to the diameter size of shaft 14. That is, ball socket 46 is movable into vertical superposition with respect to ball-hitch 16 by dint of the play between ring passage 44 and said shaft 14. However, the play may be eliminated where the ball socket is hingedly, pivotally or vertically and slidably adjustable in the manner well known in the prior art.

After the ball- and post-hitch members and the coupler are connected, pin means 28 is introduced through apertures 24 and 26 are aforedescribed, to secure the advantageous double connection between the draft and tow vehicles to thereby provide the effective and highly convenient coupling arrangement which is the essential objective of the present invention.

It will be understood that many details of the structure herein described may be varied without departing from the scope of the invention as defined in the following claims.

What is claimed is:

1. A coupling unit for vehicles comprising in combination a first member adapted for attachment to a first vehicle and a second member adapted for attachment to a second vehicle, said first member comprising a base part lying in a vertical plane when attached to said first vehicle, a pair of relatively spaced upper and lower projection members connected to said base part and extending generally horizontally therefrom, said projection members each having a passage therethrough, a post-hitch member removably received within said passages, a ball-hitch member connected to said post-hitch member at one end thereof and disposed above the upper projection member, said second member comprising a horizontal bar having a horizontally disposed enlarged ring passage therethrough and a ball-socket spacedly supported above said ring passage, said ball-hitch member being receivable within said ball socket and said post-hitch member being receivable within said ring passage thereby providing a double connection between said first and second vehicles when said first and second members are attached to said respective vehicles and said ball-hitch and post-hitch members are concurrently received within said ball socket and ring passage respectively.

2. A coupling unit as set forth in claim 1 comprising a plate member connected to said lower projection member and disposed to partially obstruct the passage thereof, the other end of said post-hitch member being bifurcated and arranged to straddle said plate member whereby rotation of said post-hitch member is precluded notwithstanding movement of said ball socket with respect to said ball-hitch member when said first and second members are connected.

3. A coupling unit as set forth in claim 2 wherein said plate member and said other end of said post-hitch member each are provided with an aperture therethrough, and pin means extending through said apertures to preclude withdrawal of said post-hitch member from said passages of said projection members.

4. A coupling unit as set forth in claim 1 including stop means provided annularly of said post-hitch member and adjacent with respect to said ball-hitch member.

References Cited

UNITED STATES PATENTS

| 2,665,144 | 1/1954 | Birewell | 280—515 X |
| 3,198,056 | 8/1965 | Gowan | 280—15 X |

FOREIGN PATENTS

| 500,043 | 2/1954 | Canada. |

BENJAMIN HERSH, *Primary Examiner.*

J. SIEGEL, *Assistant Examiner.*